United States Patent [19]
Johnson et al.

[11] Patent Number: 5,809,232
[45] Date of Patent: Sep. 15, 1998

[54] SYTEM FOR SEARCHING UNSEEN MESSAGES IN A MAIL INBASKET WHILE AN UNSENT MAIL DISTRIBUTION IS COMPOSED AND PRESENTING SENDER WITH DIFFERENT OPTIONS UPON SUCH DETECTION

[75] Inventors: Sophia M. Johnson; William J. Johnson, both of Flower Mound, Tex.

[73] Assignee: International Business Machines Corporation, Armonk, N.Y.

[21] Appl. No.: 172,455

[22] Filed: Dec. 22, 1993

[51] Int. Cl.$^6$ .................................................. G06F 13/00
[52] U.S. Cl. ................... 395/200.04; 395/600; 395/650; 395/700; 379/67
[58] Field of Search .................................. 364/400, 514; 358/400; 395/600, 200.04, 650, 700; 379/67

[56] References Cited

U.S. PATENT DOCUMENTS

| | | | |
|---|---|---|---|
| 5,230,048 | 7/1993 | Moy | 395/600 |
| 5,245,532 | 9/1993 | Mourier | 364/400 |
| 5,315,504 | 5/1994 | Lemble | 364/400 |
| 5,325,310 | 6/1994 | Johnson et al. | 364/514 |
| 5,404,483 | 4/1995 | Stamm et al. | 395/425 |
| 5,408,333 | 4/1995 | Kojima et al. | 358/400 |

OTHER PUBLICATIONS

IBM TDB, "Method for Remotely Managing Mail Distribution Addendum", Oct. 1993, pp. 443–444.
IBM TDB, "Method for Cross–Service Predicate Search Conditions,", Jul. 1993, pp. 219–220.
IBM TDB, "Method for Cross–Service Predicate delete Conditions", Jun. 1993, pp. 7–8.
IBM TDB, "Alert Notification by Set of Thresholds", Nov. 1991, p. 214.
IBM TDB, "Automatic Addressing of Outgoing Mail", Sep. 1989, p. 173.

*Primary Examiner*—Thomas C. Lee
*Assistant Examiner*—Le Hien Luu
*Attorney, Agent, or Firm*—Norman L. Gundel

[57] ABSTRACT

A method and apparatus for the distribution of arbitrary media are provided. In one embodiment, during the preparation of an electronic mail item, the invention searches a electronic mail inbasket for items received from the address to which the electronic mail item is to be sent. A list of any such inbasket items is presented to the user before the item being prepared may be sent. The user is offered the option of viewing any such received items, editing the item being prepared, sending the item being prepared without further editing, or aborting the item being prepared. In another embodiment, upon the dialing of a telephone call, the invention searches a voice mail inbasket for recorded audio messages received from the telephone whose number has been dialed, and offers the user similar options if any such inbasket items are found.

21 Claims, 2 Drawing Sheets

SYTEM FOR SEARCHING UNSEEN MESSAGES IN A MAIL INBASKET WHILE AN UNSENT MAIL DISTRIBUTION IS COMPOSED AND PRESENTING SENDER WITH DIFFERENT OPTIONS UPON SUCH DETECTION

BACKGROUND OF THE INVENTION

1. Field of the Invention

The present invention relates to data processing systems and more particularly to data processing system for the distribution of arbitrary media such as electronic mail and voice mail.

2. Description of the Related Art

Data processing systems may be used for the distribution and storage of arbitrary media such as electronic mail and voice mail messages. Data processing systems that include multiple individual workstations or terminals may be provided with an electronic mail application. An electronic mail application allows a person, called a user, who is using one such workstation or terminal, to send a mail item, such as a message or note, to another receiving user at another workstation or terminal. The item is placed in the receiving user's electronic mailbox, which is accessible by the receiving user on the receiving user's workstation. The receiving user may receive a notification that a new mail item has been received by his mailbox. The receiving user may open his mailbox, view the newly received item, retain the item in his mailbox, store the item in one or more notelogs or other more permanent storage, or delete the item. He may also reply to the sender of the item or forward the item to other users of the data processing system, optionally attaching additional comments of his own.

An item being sent from one user to another will ordinarily contain, or include a pointer to, an electronic address of the receiving user. The item may also contain, or include a pointer to, an electronic address of the sending user. The item may also contain information such as text or graphics or multimedia information. It may also contain information in specialized fields, such as a subject field, fields for other recipients or copy recipients of the item, fields for pointers to other files that may be sent along with the item or that are accessible in some common repository, fields for action dates such as response due dates, reply after dates, reply by dates, expiration dates, and other dates. The item may also contain other items or data files, such as an item being replied to, either as text or by use of a pointer to the location of such other items or files.

A data processing system may also be a telephone system. A telephone system such as a public telephone network or a private branch exchange, may include multiple individual telephone instruments, each of which may have a unique address, a telephone number or extension number. Other data processing telephone systems may be a single telephone instrument, which may be connected to a public telephone network or private branch exchange. Such single telephone instruments may be capable of receiving "Caller ID" information. "Caller ID" information may include the telephone number of a telephone from which an arriving call has been placed and a name associated with that telephone number.

Telephone calls may be directed to and received and answered at an individual telephone instrument by a human user of the telephone system. If the telephone call is not answered by a human user after a suitable interval, the telephone system may respond to the call and offer the caller the option of leaving a recorded audio message in the user's voice mailbox. Some telephone systems associate, to such recorded audio message, the time that the message was received. Some telephone systems, including some systems equipped for "Caller ID" and some private branch exchanges and some individual telephone instruments, have the capability to associate, to the recorded audio message, the telephone number or extension number of the caller's telephone and also a person's name associated with that telephone number.

Both electronic mail applications and telephone systems permit a user to compose and send an electronic mail item or place a telephone call. Composing and sending an item can take some time and even placing a telephone call is not necessarily instantaneous. It is, therefore, possible for the user to receive an item or call or recorded audio message, while he is composing an item or placing a call, from the intended recipient of his item or call. A previously received item or recorded audio message from the intended recipient may also reside in the user's electronic or voice mailbox, either not yet viewed or previously listened to and subsequently forgotten by the user. A visible or audible indicator that a message has arrived or that a mailbox is not empty may be obscured on a crowded desktop, turned off or ignored. Even if such an indicator is perceived by the user, the indicator may fail to identify the sender of the item, call or message received.

The item or message in the electronic or voice mailbox may contain information that the user would like to know before he sends the item or completes placing the call. There is, therefore a need for a data processing system that alerts the user, before he sends an item or completes placement of a telephone call to an intended recipient, to the receipt of an item or call from the intended recipient or the presence of an item or message from the intended recipient in the user's electronic or voice mailbox.

SUMMARY OF THE INVENTION

In accordance with the invention, a method and apparatus for the distribution of arbitrary media are provided. In one embodiment, during the preparation of an electronic mail item, the invention searches a electronic mail inbasket for items received from the address to which the electronic mail item is to be sent. A list of any such inbasket items is presented to the user before the item being prepared may be sent. The user is offered the option of viewing any such received items, editing the item being prepared, sending the item being prepared without further editing, or aborting the item being prepared. In another embodiment, upon the dialing of a telephone call, the invention searches a voice mail inbasket for recorded audio messages received from the telephone whose number has been dialed, and offers the user similar options if any such inbasket items are found.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
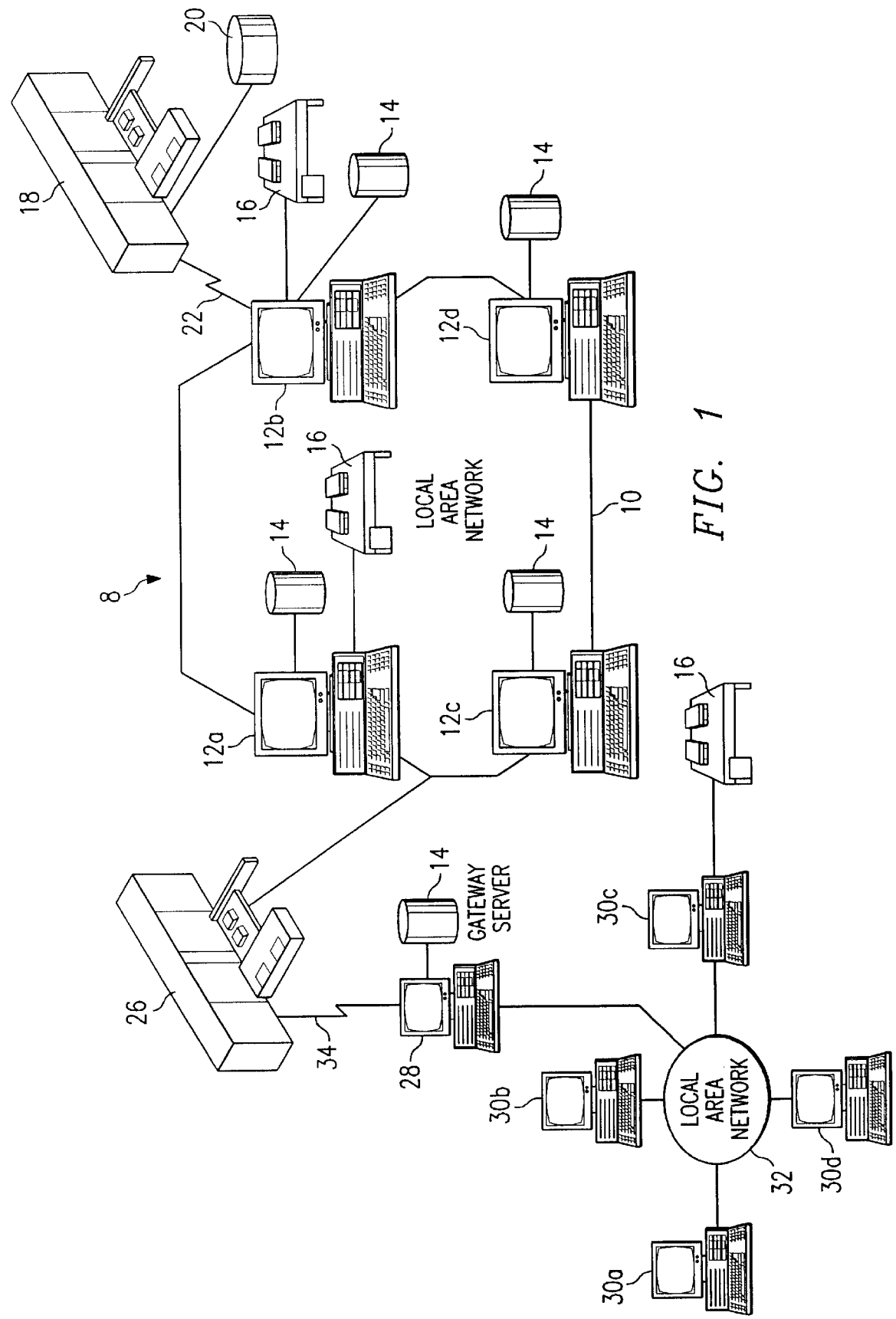
FIG. 1 is a block diagram of an apparatus used in performing the method of a preferred embodiment of the present invention and forming a part of the apparatus of a preferred embodiment of the present invention.

With reference now to the figures, and in particular with reference to FIG. 1, there is shown a pictorial representation of a data processing system 8 which may be used to implement the method and apparatus of the present invention. As may be seen, data processing system 8 may include a plurality of networks, such as local area networks 10 and 32, each of which preferably includes a plurality of individual computers 12a, 12b, 12c, and 12d; and 30a, 30b, 30c, and 30d, respectively. Alternatively, a plurality of intelligent workstations or dumb terminals coupled to a host processor may be utilized for each such network.

Each individual computer may be coupled to a storage device 14 and/or a display printer/output device 16. One or more such storage devices 14 may be utilized to store various documents or software applications, which may be addressed by a user of each individual computer within the data processing system 8.

Still referring to FIG. 1, data processing system 8 may also include multiple mainframe computers, such as mainframe computer 18, which may be preferably coupled to local area network 10 by means of communications link 22. Mainframe computer 18 may also be coupled to a storage device 20 which may serve as remote storage for local area network 10 and may also be coupled by a communications controller 26 and communications link 34 to gateway server 28. Gateway server 28 is preferably an individual computer or intelligent workstation which serves to link local area network 32 to local area network 10.

Still referring to FIG. 1, the data processing system 8 preferably also includes an electronic mail application such as that included in IBM OfficeVision/VM (trademarks of IBM Corp.). The electronic mail application allows an individual user of the data processing system, called a sender, to compose and send an item, called an item, note or mail distribution, to one or more other users, called receivers. The item is placed in the receiving user's electronic mailbox, which is accessible by the receiving user on the receiving user's workstation. The receiving user may receive a notification that a new mail item has been received by his mailbox. The receiving user may open his mailbox, view the newly received item, retain the item in his mailbox, store the item in one or more notelogs or other more permanent storage, or delete the item. He may also reply to the sender of the item or forward the item to other users of the data processing system, optionally attaching additional comments of his own.

An item being sent from one user to another will ordinarily be associated with, by containing or including a pointer to, an electronic address of the receiving user. The item may also be associated with, by containing or including a pointer to, an electronic address of the sending user. The item may also be associated with information such as text or graphics or multimedia information. It may also be associated with information in specialized fields, such as a subject field, fields for other recipients or copy recipients of the item, fields for pointers to other files that may be sent along with the item or that are accessible in some common repository, fields for action dates such as response due dates, reply after dates, reply by dates, expiration dates, and other dates. The item may also be associated with other items or data files, such as an item being replied to, either as text or by use of a pointer to the location of such other items or files.

Figure 2:
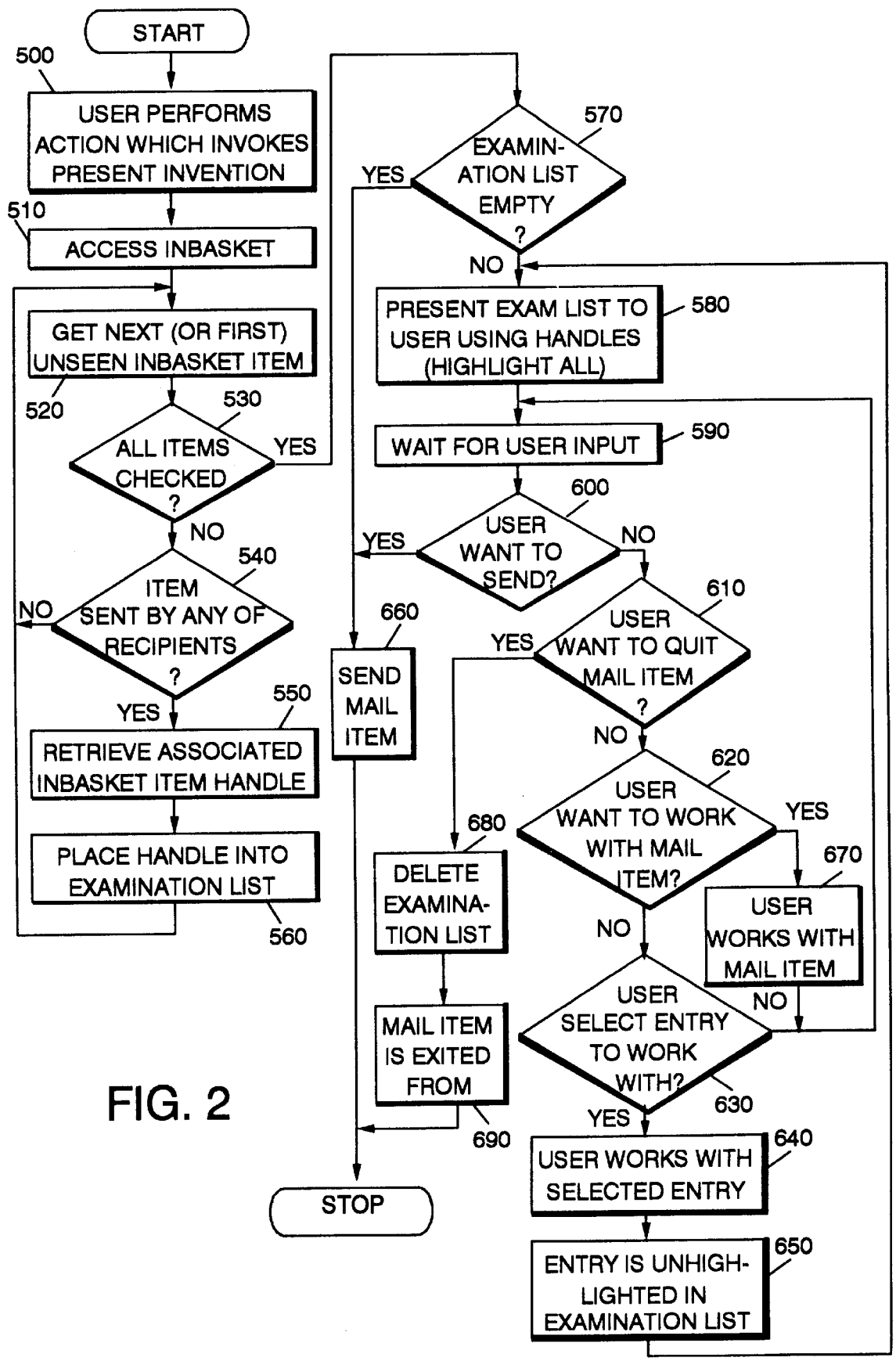
FIG. 2 is a high level logic flowchart illustrating the method of a preferred embodiment of the process of the present invention.

Referring now to FIG. 2, a flowchart illustrating the operations preferred in carrying out the present invention are shown. The process begins at process block 500, which represents the user action which invokes the present invention. The user may indirectly invoke the invention by creating a mail distribution, which may be called an item, replying to a mail distribution with another mail distribution, or forwarding a mail distribution and invoking the send function. The mail distribution may be voice mail, electronic mail, or the like.

The invention may also be invoked in process block 500 by the user's receipt of a mail distribution while editing an in-progress mail distribution. Either mail distribution may be phone mail, electronic mail, or the like.

Lastly, at process block 500, the user may invoke the invention directly by invoking a command, hot key, menu option, or the like in order to directly invoke the present invention.

After invocation at block 500, the process proceeds to block 510, where the user's mail inbasket is accessed, and then to block 520 where the first (or next) unseen inbasket item in the inbasket is retrieved. The process continues to block 530, for a determination of whether all unseen inbasket items have been processed. If, as determined by block 530, all items retrieved have not been processed, then the process proceeds to block 540. Block 540 makes a determination of whether the item retrieved in block 520 was sent by any user to whom any mail item now being prepared is addressed. If, in block 540, the inbasket item was sent by any recipient of any mail distribution now being prepared or sent by the user, then processing continues to block 550, where a handle to the inbasket item is retrieved. The process then proceeds to block 560 and saves the handle into an examination list. The process then proceeds from block 560 back to block 520 where the next inbasket item is retrieved.

Referring now back to block 540, if the unseen inbasket item was not originated by any of the recipients in the distribution now being prepared or sent by the user, then the process proceeds from block 540 back to block 520 where the next inbasket item is retrieved.

Blocks 520, 530, 540, 550 and 560 define a processing loop which is used to process all inbasket items which have not been seen by the user. The examination list built in block 560 is understood to be empty before processing in said loop. The examination list will contain entries, each of which is a handle to an inbasket item. Preferred handle embodiments include relative inbasket item number, a file specification (e.g., file name, offset and length therein), a memory address, unique identifying criteria about the inbasket item, or any other representation which uniquely identifies the item and allows convenient access to it.

The processing loop of blocks 520 to 560 are described as examining only mail items in the inbasket that have not been previously viewed by the user. These items may have arrived during the preparation of the mail item itself or since the user's most recent examination of the contents of the inbasket. However, it is contemplated that the invention may be configured to examine all mail items in the inbasket, or to apply other criteria to determine which items to examine, such as those items received within a particular time interval or those items sent by or addressed to particular persons or locations.

Referring back to block 530, if block 520 is determined to either not have found a first inbasket item or have already retrieved the last inbasket item that has not been seen, then processing continues from block 530 to block 570 where the examination list is checked for any applicable entries which may have been found. If it is determined in block 570 that no entries are present in the examination list, then processing proceeds to block 660, where the currently prepared mail item may be sent, and processing then stops.

If, in block 570, one or more entries exist in the examination list, then block 580 interrupts the sending of the mail item and presents to the user a list of applicable inbasket items, which list is prepared using the examination list. The amount of information presented about each inbasket item is preferably configurable but preferably includes at least the identity of the sender of the item and the date and time of the item's receipt in the inbasket. Depending on how many entries are in the list, the list may be scrollable. All entries are initially highlighted to indicate that the user has not seen them yet. The customary inbasket handling procedures of the electronic mail application may be used to display the examination list and the underlying mail items.

After presenting the examination list to the user and allowing him to peruse it and examine the underlying mail items in block 580, the process then proceeds to block 590 where the system waits for any user input. Upon detection of user input, the process proceeds to block 600. If it is determined in block 600 that the user has elected to send the currently prepared mail distribution, then the process proceeds to block 660, sends the mail distribution and processing stops. If, in block 600, the user did not select to send the mail distribution, then processing continues to block 610.

In block 610, the process determines whether the user elected to quit the mail distribution being sent. If so, the process proceeds to block 680 and deletes the examination list. The process then proceeds to block 690 and aborts the mail distribution processing of the mail item being prepared. If, in block 610, the user did not select to quit mail processing, then processing continues to block 620.

In block 620, the process determines whether the user has elected to work with the mail distribution being sent. If so, then processing continues to block 670 where the user may work with the mail distribution by editing it. Upon examination of applicable unseen mail, the user may have encountered information that affects or is worthy of incorporating into the currently prepared distribution. Upon completion of the editing in block 670, the process proceeds to block 590 as previously described to await user input.

If the user did not elect to work with the mail item, as determined by block 620, then processing continues to block 630 for a determination of whether the user has elected to work with one of the mail items listed on the examination list. If block 630 determines that the user input a selection of one of the entries in the examination item list, then the process proceeds to block 640 and allows the user to work with the associated inbasket item. The user may perform arbitrary inbasket processing on the item as provided by the underlying mail system. The process then proceeds from block 640 to block 650 where the associated examination list entry presented to the user is marked UNhighlighted, thereby indicating to the user that the underlying mail item worked with in block 640 has now been seen. The process then proceeds from block 650 back to block 580 where the updated examination list (with new highlight) is presented to the user. Block 580 continues as previously described.

If block 630 determined that the user did not select an examination list entry for inbasket processing, then processing continues from block 630 back to block 590 as previously described to await user input.

It should be apparent from the embodiment heretofore presented that the user sending a mail distribution was automatically interrupted with notification of all inbasket items that were applicable to and may affect the content of the mail distribution being sent. The user was notified of all unseen inbasket items which were originated by any recipient of the distribution to be sent. An alternative embodiment could implement applicability through subject matter, content criteria or any characteristic that relates to the currently sent mail distribution.

An additional alternative embodiment may perform the process described above in a data processing system that is a telephone system. The telephone system may comprise a public network or a private branch exchange. The telephone system may also be an individual telephone instrument that permits the placing of outgoing calls and incorporates a telephone answering system that may associate the audio messages it records with "Caller ID" information that it receives in association with incoming calls. Such "Caller ID" information may include the telephone number from which the audio message was received. The process described above may be invoked when a call is placed on the telephone instrument to a number that is associated with a message that is recorded in the instrument's answering system. The user is then advised that the message is waiting before the call is placed and offered the option of listening to the message before the call is completed.

An alternative voice mail telephone system embodiment may also implement pending unseen item applicability with item characteristics other than or in addition to "Caller ID," such as through content criteria or any characteristic that relates to the in-progress call or outgoing telephone communication.

While the invention has been particularly shown and described with reference to a preferred embodiment and process, it will be understood that various changes in form and detail may be made therein without departing from the spirit and scope of the invention.

What is claimed is:

1. A method, performed in a data processing system, the method comprising the computer implemented steps of:

searching unseen mail inbasket items while an unsent mail distribution is composed for a characteristic associated with the unsent mail distribution;

prior to sending the mail distribution, presenting a notice that a mail inbasket item associated to the characteristic has been found; and requiring a user response to the notice before the mail distribution is sent including the options of aborting the mail distribution, editing the mail distribution, and viewing a mail inbasket item that is associated with the characteristic.

2. The method of claim 1, wherein the unsent mail distribution is an electronic mail item and the characteristic associated with the unsent mail distribution is an address to which the electronic mail item is directed.

3. The method of claim 1, wherein the unsent mail distribution is an electronic mail item and the characteristic associated with the unsent mail distribution is any common content of both the electronic mail item and the mail inbasket item.

4. The method of claim 1, wherein the unsent mail distribution is a telephone call and the characteristic associated with the unsent mail distribution is the telephone number to which the telephone call is directed.

5. The method of claim 1, wherein the unsent mail distribution is an outgoing telephone message and the characteristic associated with the unsent mail distribution is any common content of both the outgoing telephone message and the mail inbasket item.

6. The method of claim 1, wherein only those mail inbasket items received by the mail inbasket while the mail distribution is being prepared are searched.

7. The method of claim 1, wherein the notice presented prior to sending the mail distribution includes a list of searched mail inbasket items that are associated to the characteristic.

8. A data processing system, comprising:
   means for searching unseen mail inbasket items while an unsent mail distribution is composed for a characteristic associated with the unsent mail distribution;
   means for presenting a notice that a mail inbasket item associated to the characteristic has been found, prior to sending the mail distribution; and
   means for requiring a user response to the notice before the mail distribution is sent including the options of aborting the mail distribution, editing the mail distribution, and viewing a mail inbasket item that is associated with the characteristic.

9. The data processing system of claim 8, wherein the unsent mail distribution is an electronic mail item and the characteristic associated with the unsent mail distribution is an address to which the electronic mail item is directed.

10. The data processing system of claim 8, wherein the unsent mail distribution is an electronic mail item and the characteristic associated with the unsent mail distribution is any common content of both the electronic mail item and the mail inbasket item.

11. The data processing system of claim 8, wherein the unsent mail distribution is a telephone call and the characteristic associated with the unsent mail distribution is the telephone number to which the telephone call is directed.

12. The data processing system of claim 8, wherein the unsent mail distribution is an outgoing telephone message and the characteristic associated with the unsent mail distribution is any common content of both the outgoing telephone message and the mail inbasket item.

13. The data processing system of claim 8, wherein the means for searching searches only those mail inbasket items received by the mail inbasket while the mail distribution is being prepared.

14. The data processing system of claim 8, wherein the notice presented prior to sending the mail distribution includes a list of searched mail inbasket items that are associated to the characteristic.

15. A computer program product, for use in a data processing system, the computer program product comprising:
   a computer usable medium having computer readable program code embodied in said medium, said computer program product including:
      computer readable program code means for searching unseen mail inbasket items while an unsent mail distribution is composed for a characteristic associated with the unsent mail distribution;
      computer readable program code means for presenting a notice that a mail inbasket item associated to the characteristic has been found, prior to sending the mail distribution; and
      computer readable program code means for requiring a user response to the notice before the mail distribution is sent including the options of aborting the mail distribution, editing the mail distribution, and viewing a mail inbasket item that is associated with the characteristic.

16. The computer program product of claim 15, wherein the unsent mail distribution is an electronic mail item and the characteristic associated with the unsent mail distribution is an address to which the electronic mail item is directed.

17. The computer program product of claim 15, wherein the unsent mail distribution is an electronic mail item and the characteristic associated with the unsent mail distribution is any common content of both the electronic mail item and the mail inbasket item.

18. The computer program product of claim 15, wherein the unsent mail distribution is a telephone call and the characteristic associated with the unsent mail distribution is the telephone number to which the telephone call is directed.

19. The computer program product of claim 15, wherein the unsent mail distribution is an outgoing telephone message and the characteristic associated with the unsent mail distribution is any common content of both the outgoing telephone message and the mail inbasket item.

20. The computer program product of claim 15, wherein the computer readable program code means for searching searches only those mail inbasket items received by the mail inbasket while the mail distribution is being prepared.

21. The computer program product of claim 15, wherein the notice presented prior to sending the mail distribution includes a list of searched mail inbasket items that are associated to the characteristic.

* * * * *